| United States Patent [19] | [11] Patent Number: 4,542,066 |
| Delzant | [45] Date of Patent: Sep. 17, 1985 |

[54] MODIFYING GLASS BEAD SURFACES

[75] Inventor: Marcel Delzant, Mont-sur-Marchienne, Belgium

[73] Assignee: Glaverbel, Brussels, Belgium

[21] Appl. No.: 531,453

[22] Filed: Sep. 12, 1983

[30] Foreign Application Priority Data

Sep. 14, 1982 [GB] United Kingdom ............... 8226106

[51] Int. Cl.$^4$ ..................... B05D 7/00; C03B 27/00; C03C 15/00; C03C 17/00
[52] U.S. Cl. ..................................... 428/406; 65/30.1; 65/31; 65/60.8; 427/220
[58] Field of Search ...................... 65/60.3, 60.8, 30.1, 65/31; 427/220; 428/405, 406

[56] References Cited

U.S. PATENT DOCUMENTS

| 3,061,495 | 10/1962 | Alford | 65/30.1 |
| 3,291,633 | 12/1966 | Wissinger | 428/405 |
| 3,837,892 | 9/1974 | Marzocchi | 427/220 X |
| 4,039,331 | 8/1977 | Lee | 428/405 X |
| 4,130,407 | 12/1978 | Ida | 65/30.1 |
| 4,233,366 | 11/1980 | Sample et al. | 428/405 |

Primary Examiner—Michael R. Lusignan
Attorney, Agent, or Firm—Spencer & Frank

[57] ABSTRACT

A method of modifying the surface of hollow glass beads including the step of treating the beads with a solution containing at least one of an organic acid selected from beta-hydroxy acids, oxalic acid and ethylene diamine tetraacetic acid, and a salt of said organic acid.

16 Claims, No Drawings

MODIFYING GLASS BEAD SURFACES

BACKGROUND OF THE INVENTION

The present invention relates to a method of modifying the surface of hollow glass beads.

Hollow glass beads are often used as fillers for, for example, plastics materials and it will be appreciated that such beads should desirably conform with a number of criteria.

Firstly, the beads should be well formed for the purposes in view. For most practical purposes, this means that the beads should be closed and of similar size and density. Ensuring this according to current manufacturing techniques can give rise to considerable difficulties, so that in practice this means that a high proportion of any malformed beads present in a bulk supply of beads should be eliminated.

Secondly, the beads should have the correct bulk density for the purpose in view. It is usually important to have a low bulk density, and this is not always easy to achieve in the initial bead forming process.

Thirdly, we have found it desirable that the surfaces of the hollow glass beads should be polished. Such polishing removes surface defects from the glass so that the removed defects are no longer available as stress-raisers. Thus when comparing hollow glass beads of the same wall thickness, a polished bead will have a better mechanical resistance than an unpolished bead. The polishing of hollow glass beads is especially advantageous where the beads are to be used as filler in a resin. Stress distribution in a resin about a perfect sphere is uniform, symmetrical and predictable. Using polished beads as filler enables the mechanical properties of the filled resin to be more easily predicted and adjusted in view of the amount of filler used, and allows the production of a filled resin with homogeneous and isotropic mechanical properties. Of course when polishing a given hollow glass bead, the thickness of its walls will be reduced but there is nevertheless an improvement in the relative mechanical resistance of the bead. Since material is removed from the surfaces of glass beads by polishing, their bulk density will be reduced.

SUMMARY OF THE INVENTION

It is an object of the present invention to provide a method of modifying the surface of hollow glass beads which provides a first step in a useful and very simple method of eliminating a high proportion of any malformed beads which may be present and which allows the bulk density of the beads to be reduced so that such density can be adjusted to within fine limits.

Certain other objects of the invention which appertain more particularly to preferred optional features of this invention will be adverted to later in this specification.

According to the present invention, there is provided a method of modifying the surface of hollow glass beads, characterised in that such beads are treated with a solution containing an organic acid selected from betahydroxy acids, oxalic acid and ethylene diamine tetraacetic acid and/or a salt of a said organic acid.

DESCRIPTION OF THE PREFERRED EMBODIMENTS

When hollow glass beads are subjected to a treatment according to the invention, the beads are attacked by the acid or salt and material is removed from the surfaces of the hollow beads so that their walls are reduced in thickness thus also reducing their bulk density. Also because such material is removed from the walls of the beads, any malformed beads having too thin a wall can have that wall ruptured by the treatment, so that if in a second step the treated mass of beads is floated in a tank, the ruptured beads will sink and the treated well-formed beads can be skimmed off from the surface leaving behind those whose walls lack integrity.

In some cases it has been observed that the treatment results in a polishing of the surface of the beads and, it is believed, this can sometimes lead to an increase in their mechanical resistance. It will be appreciated that there comes a time when any increased strength of the beads due to their polishing is matched or overmatched by a decrease in strength due to a reduction in wall thickness, and this should be taken into account when the mechanical resistance of the beads is of prime importance.

Beta-hydroxy acids particularly useful in the performance of the invention are, in increasing order of preference malic acid, tartaric acid, gluconic acid and citric acid. It will be noted that in addition to being beta-hydroxy acids, these are also alpha-hydroxy acids as is preferred. Particular preference is given to the use of a solution containing citric acid or a citrate.

When an organic acid salt is used, it is preferred to use a sodium salt.

Advantageously, at the beginning of said treatment the solution has a pH of at least 5 and preferably in the range 7 to 10 inclusive. This allows good control of the rate at which the reactions take place, and, at least when starting at the lower end of such a limited pH scale, also promotes dealkalising of the surface of the beads.

In some preferred embodiments of the invention, said beads are treated with a solution which includes at least one other acid having a dealkalising effect. This promotes reduction in the sodium concentration in the vitreous material, especially at the surfaces of the beads. Such dealkalising acid treatment can precede or follow treatment with the solution containing the organic acid or salt referred to above, but it is more convenient in practice for said organic acid or salt treatment and such dealkalising acid treatment to take place during overlapping time periods as is preferred. The use of a said organic acid or salt in combination with such a dealkalising acid is considered to be particularly important since it enables significant quantities of sodium ions to be leached from the glass surface. Such dealkalising treatment preferably commences before said organic acid or salt treatment and preferably when such dealkalising treatment commences, the dealkalising acid solution has a pH of at least 2.5.

There are rather few large scale manufacturers of hollow glass beads in the world, and in the bead forming processes principally used the starting material contains a high proportion of sodium silicate, often in solution with a boron compound, so that the beads produced usually have a very high sodium content, for example 25% by weight sodium oxide. Because of its high sodium content, the glass of which the beads are formed is vulnerable to hydrolytic attack, and such attack can lead to the beads becoming unbonded from a material in which they are used as a filler, thus degrading the product. Treatment of the beads with dealkalising acid leaches out sodium ions from the surfaces of the beads so that the sodium ion concentration at the bead surfaces can be reduced to a level comparable with that of soda lime glass, for example 13% by weight, or even to a lower level if desired, and consequently the beads are rendered more resistant to hydrolytic attack.

Dealkalisation of the bead surfaces and their treatment in an acidic medium can also promote priming of the beads for their incorporation as a filler into plastics material. For example when hollow glass beads are used as fillers for polyester or alkyd resins they are often primed with methacryloxy silanes, and when used as fillers for epoxy resins, they may be primed with glycidyl silanes, to promote adhesion between the glass and the resin. Priming is enhanced if these types of silane contact the glass under acid conditions.

Such dealkalising acid is advantageously an inorganic acid, preferably selected from hydrochloric acid, nitric acid and sulphuric acid. The use of hydrochloric acid is especially preferred.

A treatment according to the invention preferably takes place by suspension and agitation of said beads in a bath of said solution, and after said treatment, said beads are preferably passed to a flotation tank to separate integral and broken beads. The integral beads float and the broken beads sink.

In some preferred embodiments of the invention, said beads are treated with a silane primer after said treatment, so as to promote their adhesion to plastics material.

The following are particular Examples of processes according to the present invention.

EXAMPLE 1

In order to produce hollow vitreous beads, solutions of various starter materials were formed into a slip which contained:

sodium silicate 100 parts by weight
calcium hydroxide 2.64 parts by weight
sodium carbonate 3.41 parts by weight
water to a viscosity of 2300 cP, and urea.

The slip was sprayed as droplets less than 500 $\mu$m in size into a combustion chamber in which they were converted into hollow vitreous beads.

The glass beads produced had the following approximate composition by weight: $SiO_2$ 70%; $Na_2O$ 25%; CaO 5%. These beads were treated in accordance with the present invention. The beads produced were mostly below 125 $\mu$m in diameter, the average diameter being in the range 60 to 70 $\mu$m. Well-formed beads had a wall thickness of the order of 1 to 3 $\mu$m, and the average density of the beads was 0.35 kg/L.

A solution for treating 1m³ of such beads was made up by mixing 100 L concentrated hydrochloric acid with 900 L water and dissolving 20 kg of citric acid. The pH of the solution thus obtained was close to 0. The solution was heated to 80° C. in a bath and the beads were introduced into the solution and were continuously agitated for a period of 15 minutes after which the pH was about 7. At the end of that period, the beads were removed from the treatment solution and transferred to a flotation tank containing water, where a high proportion of malformed beads sank. The floating beads were then skimmed off. The malformed beads sank because their walls had either not been properly formed in the first place or because their walls were too thin to withstand the corrosive effect of the citric acid.

At the end of the treatment the well-formed beads had a typical density of 0.28 kg/L and the sodium ion content of surface layers of the beads, calculated as weight percent sodium oxide, had been reduced from 25% to 13%.

The treated beads were divided into three batches.

The first two batches were primed by adding them to solutions of a methacryloxy silane and agitating them, whereafter the batches of primed beads were respectively introduced into polyester and alkyd resins as filler.

The third batch was primed using a glycidyl silane solution and was then added to an epoxy resin as filler.

In a variant of this Example, the citric acid was omitted from the initial treatment solution and was only added to the treatment bath when the pH of the solution therein had risen to 5. Similar results were achieved.

EXAMPLES 2 TO 6

Glass beads for treatment by a method according to the present invention had the following composition by weight: $SiO_2$ 68%; $B_2O_3$ 7%; $Na_2O$ 25%.

For treating one cubic metre of such beads, 100 L commercial concentrated hydrochloric acid was dissolved in 900 L water. This dealkalising acid solution was heated to 75° C. in a bath and the beads were treated therein for 10 minutes while the temperature was maintained.

One cubic metre of beads thus treated was then placed in one cubic metre of an aqueous solution of an organic acid whose pH, before contact with the glass was between 4 and 6.

The acid and amount used in each of these Examples was:

Example 2 Versenic acid—36.5 kg
Example 3 Tartaric acid—12.0 kg
Example 4 Oxalic acid—8.0 kg
Example 5 Gluconic acid—32.0 kg
Example 6 Malic acid—13.0 kg In each Example, treatment continued for 20 minutes at 75° C., whereafter the treatment was stopped and still floating beads were skimmed off from the surfaces of the bath. In each case a reduction in the actual average density of the beads from 0.32 g/mL to 0.28 g/mL was noted. The proportion by weight of $Na_2O$ in the bead surfaces had been reduced from 25% to about 10%.

In variants of these Examples in which the hydrochloric acid treatment was omitted so that the beads were treated for 20 minutes at 75° C. in the organic acid solutions, a similar density reduction was obtained, but the surface content of $Na_2O$ was only reduced to about 22%.

In a modification of the foregoing Examples, hollow glass beads of the composition given in Examples 2 to 6 were treated by the method of Example 1.

In further modifications, it was found that substituting the organic acid used in any of Examples 1 to 6 by an appropriate quantity of a salt of that acid, for example a sodium salt, made no significant difference to the density reduction afforded.

EXAMPLE 7

Glass beads for treatment by a method according to the present invention had the composition indicated in examples 2 to 6. The actual average density of the beads was 0.30 kg/L. Such beads were treated with an aqueous solution of hydrochloric acid. The pH of that solution was about 3 before contact with the beads. The beads were introduced into the solution and continuously agitated. At the end of that treatment the solution had a pH of about 7 and the alkali content of the beads had been reduced from 25% to 13% without substantially affecting their density.

The beads thus treated were then placed in a bath formed by an aqueous solution of citric acid and sodium citrate whose pH, before contact with the beads was between 5.5 and 6.

After about 15 minutes the floating beads were skimmed off the surface of the bath.

The skimmed beads were well-formed beads having a polished surface, having a substantially unmodified alkali content (13%) and having a slightly modified density (0.29 kg/L).

I claim:

1. A method of modifying the surface of hollow glass beads, comprising treating the beads with a solution containing an effective amount of at least one of an organic acid selected from beta-hydroxy acids, oxalic acid and ethylene diamine tetraacetic acid, and a salt of said organic acid.

2. A method according to claim 1, wherein the beta-hydroxy acid is also an alphy-hydroxy acid.

3. A method according to claim 2, wherein the beta-hydroxy acid is citric acid.

4. A method according to claim 1, wherein at the beginning of said treating step the solution has a pH of at least 5.

5. A method according to claim 4, wherein said treating step includes treating the beads with a solution which includes at least one other acid with a dealkalising effect.

6. A method according to claim 5, wherein said treating of the beads with at least one of an organic acid and a salt of the organic acid, and said treating of the beads with a dealkalising acid take place during overlapping time periods.

7. A method according to claim 5 or 6, wherein said treating of the beads with a dealkalising acid commences before said treating of the beads with at least one of the acid and the salt of the organic acid.

8. A method according to claim 5, wherein when said treating of the beads with a dealkalising acid commences, the dealkalising acid solution has a pH of at least 2.5.

9. A method according to claim 5, wherein the dealkalising acid is an inorganic acid.

10. A method according to claim 9, wherein the inorganic acid is selected from hydrochloric acid, nitric acid and sulphuric acid.

11. A method according to claim 1, wherein said treating step includes suspending and agitating the beads in a bath of the solution.

12. A method according to claim 1, including the step of passing the beads to a flotation tank after said treating step.

13. A method according to claim 1, including the step of contacting the beads with a silane primer after said treating step.

14. Hollow glass beads treated by the method according to claim 1.

15. Material comprising hollow glass beads according to claim 14.

16. A method according to claim 1, wherein at the beginning of said treatment step the solution has a pH in the range of 7 to 10, inclusive.

* * * * *